United States Patent [19]

Edwards

[11] Patent Number: 5,093,837
[45] Date of Patent: Mar. 3, 1992

[54] BAFFLE FOR ATTENUATING OFF-AXIS LIGHT EMISSIONS

[75] Inventor: Oliver J. Edwards, Foster City, Calif.
[73] Assignee: S-Tron, Mountain View, Calif.
[21] Appl. No.: 666,822
[22] Filed: Mar. 8, 1991
[51] Int. Cl.⁵ ............................................. H01S 3/08
[52] U.S. Cl. .................................... 372/103; 372/98; 372/108; 359/614
[58] Field of Search ..................... 372/103, 98, 108; 350/276 SL

[56] References Cited

U.S. PATENT DOCUMENTS 3,699,471 10/1972 Mulready et al. ..................... 372/98
4,217,026 8/1980 Raddvich ..................... 350/276 SL
4,820,923 4/1989 Wellman ..................... 350/276 SL Primary Examiner—Leon Scott, Jr.
Attorney, Agent, or Firm—Townsend and Townsend

[57] ABSTRACT

A scatter shield attenuates off-axis illumination emanating from a light beam projector. The scatter shield comprises an elongate housing, usually cylindrical, having at least two baffles therein. The dimensions of the scatter shield are selected to assure that off-axis illumination exceeding a preselected angle of divergence is internally reflected within the shield at least three times. Such multiple reflections provide for highly efficient attenuation.

21 Claims, 3 Drawing Sheets

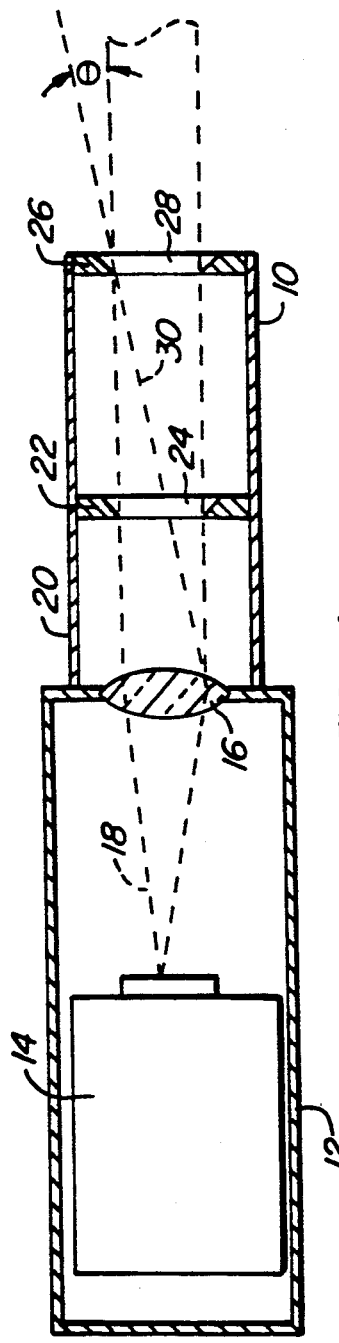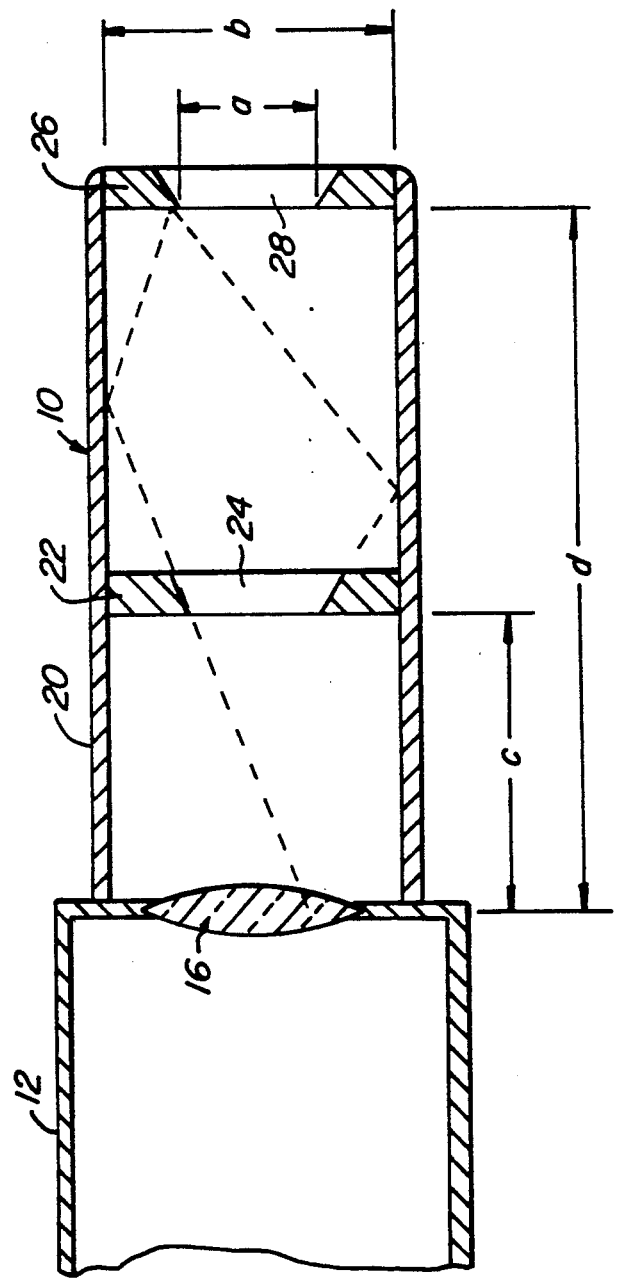

BAFFLE FOR ATTENUATING OFF-AXIS LIGHT EMISSIONS

BACKGROUND OF THE INVENTION

1. Field of the Invention

The present invention relates generally to devices for projecting light beams and more particularly to scatter shields which attenuate off-axis emissions from such devices.

Collimated light beams, particularly collimated laser light beams, are used in a variety of circumstances where it is desired that divergence of a projected beam of light be limited. For example, collimated light beams projected by light beam transmitters may be used for visually aiming firearms, for automatically targeting munitions which can home in on an illuminated spot, or for communicating through free space. When such light transmitters are used in combat situations, the presence of off-axis illumination can act as a beacon revealing the user's position to the enemy. Moreover, when collimated light beams are used for confidential communication, any off-axis illumination may be intercepted by unintended persons in the vicinity, thus compromising the sender's secrecy.

For these reasons, it would be desirable to provide a shielding system for such collimated light beam projectors, which shield system is capable of attenuating off-axis light emissions to a high degree. In particular, it would be desirable if such shield systems could reduce beam scatter to an angle of 10° or less, with scatter beyond this 10° divergence being attenuated by a factor of 100 or more.

2. Description of the Background Art

Light beam transmitters used for visually aiming firearms are generally disclosed in U.S. Pat. Nos. 1,826,004; 3,787,693; 3,867,764; 4,152,754; 4,026,054; and U.S. Pat. No. 4,738,044. A scatter shield for mounting on the front of a light target designator is disclosed in U.S. Pat. No. 4,161,835. The scatter shield comprises a honeycomb structure where the axes of the honeycomb channels are aligned with the direction of the target beam. A mirror-lens assembly for collimating a laser beam is described in U.S. Pat. No. 4,674,011. A lenstube structure for uniformly dispersing a laser light source is disclosed in U.S. Pat. No. 4,744,615. A lens for equalizing a collimated light beam to uniformly illuminate a surface is disclosed in U.S. Pat. No. 4,451,872. U.S. Pat. No. 4,048,489 discloses a light pulse generator which may be mounted on a firearm and triggered when the firearm is discharged. Baffle systems using multiple annular rings for minimizing the reception of stray light by telescopes and other optical equipment are described in MacQueen (1968) Appl. Opt. 7:1149–1154 and Gordon (Abstract WD2D) 1969 Spring Meeting, Optical Society of America. Smith, Modern Optical Engineering: The Design of Optical Systems, McGraw-Hill Book Company, New York, describes a baffle system for an optical receiver employing baffles having converging apertures to trap incoming off-axis radiation and prevent the radiation from reaching the focus of an objective lens.

SUMMARY OF THE INVENTION

A baffle assembly is provided as a scatter shield for use with a collimated light beam projector, such as a light beam transmitter used for visually aiming weapons. The baffle assembly comprises an elongate hollow housing having a preselected length and internal width. At least two baffle plates are transversely mounted within the housing and are spaced apart from each other and from a terminal optical surface of the light transmitter by preselected distances. The terminal optical surface will be the final optical element from which the collimated light beam emanates and may comprise a lens, a window, a prism, a mirror, or the like. Each baffle plate includes an aperture which is coaxially aligned with the expected path of the collimated light beam so that a properly aligned light ray will pass through the baffle assembly without attenuation. The dimensions of the baffle assembly are selected so that scattered light rays which diverge beyond a small conical angle, typically 10°, will be reflected by at least three internal surfaces before emanating from the assembly. Such multiple reflections from absorptive surfaces assure that very high attenuation of off-axis illumination is achieved.

Although the present invention is specifically illustrated in connection with a firearm aiming device, often referred to as a light beam target designator, it will be appreciated by those skilled in the art that the baffle assembly can be used with light projectors used for a wide variety of applications, including illumination, automatic target designating, free space communication, and the like.

BRIEF DESCRIPTION OF THE DRAWINGS

FIG. 1 is a schematic illustration of a scatter shield constructed in accordance with the principles of the present invention and mounted on a light beam projector.

FIG. 2 is an enlarged view of a portion of FIG. 1 illustrating certain critical dimensional parameters.

DESCRIPTION OF THE SPECIFIC EMBODIMENTS

Figure 3:
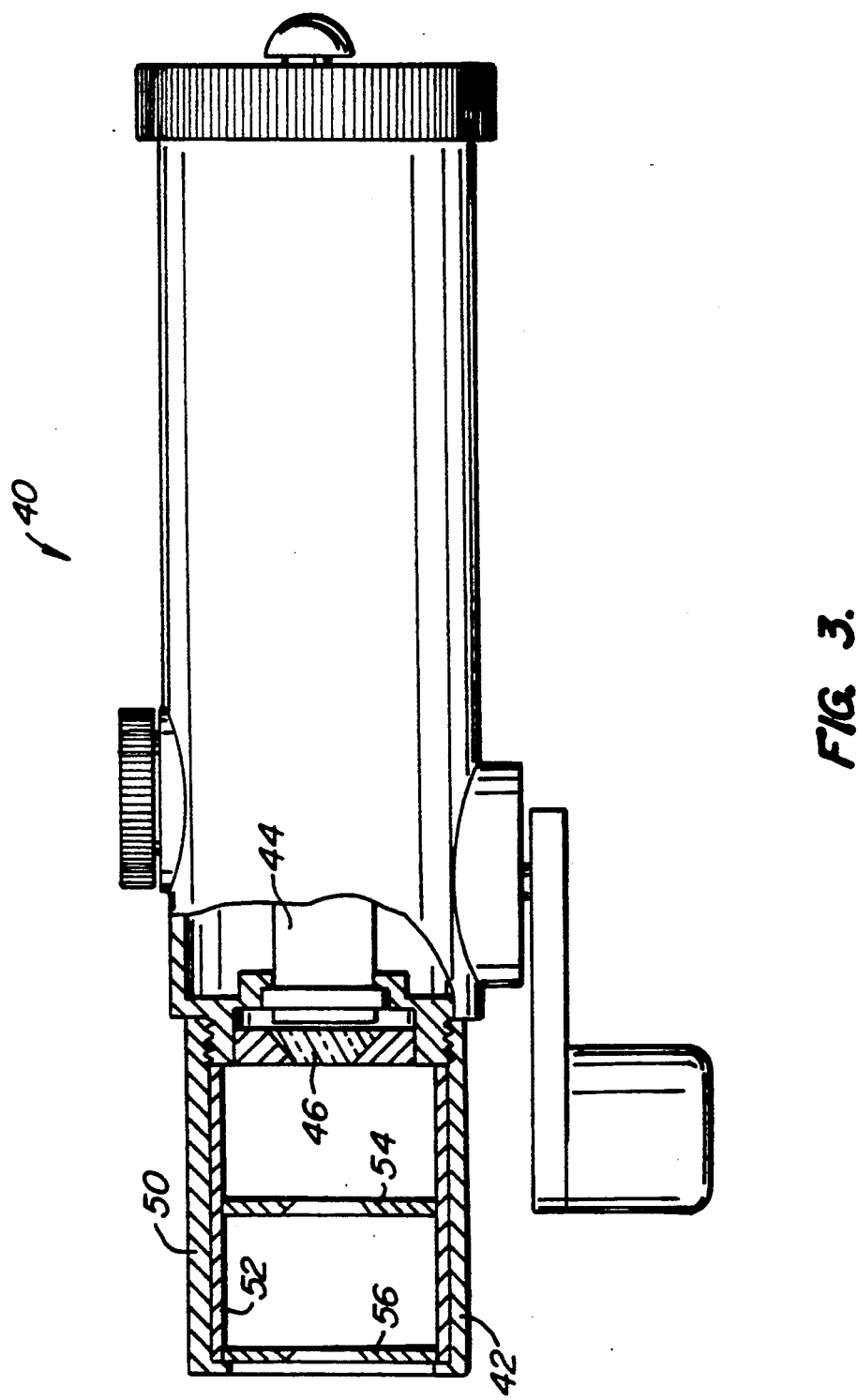
FIG. 3 is a side elevational view of a laser transmitter useful for aiming a firearm having a light scatter shield constructed in accordance with the principles of the present invention and mounted thereon.

According to the present invention, a scatter shield is provided in combination with a light beam projector capable of supplying a substantially collimated light beam along a desired linear path. The light beam projector may be used as a firearm aiming device, target designator, communication transmitter, spot illuminator, or the like. The scatter shield comprises a baffle assembly including an elongate housing having at least two baffle plates therein for attenuating non-collimated or off-axis light rays. The light beam projector includes a terminal optical surface from which the collimated light beam emanates. By selecting certain critical dimensions in the construction of the scatter shield, as discussed in more detail hereinbelow, multiple internal reflections of the off-axis light rays within the shield can be assured. Such multiple reflections, in turn, assure that highly effective attenuation of the off-axis illumination is achieved.

The light beam projector can be any device capable of projecting a substantially collimated light beam along the desired linear path. Conveniently, the light beam projector will be an intrinsically collimated laser light source having an integral terminal optical surface. Alternatively, the projector may comprise a non-collimated light source, such as a filament or arc lamp, in combination with a collimator, such as a parabolic reflector or a collimating lens assembly.

The wavelength of the light beam source is not critical and will depend on use. For light beam target designators, the light beam source will usually be in the visible range for daytime use or in the infrared range for nighttime use. The spot projected by the infrared source can be detected by users wearing suitable night vision goggles. Numerous suitable laser light sources are commercially available from suppliers such as Phillips, NEC, and RCA.

When utilized, the collimator will include the final optical element. In some cases, the terminal optical element may be physically part of the device which provides the light source, but in other cases it will be physically separate from the light source. The terminal optical surface may comprise a lens, window, prism, mirror, or the like and will be the final optical element from which the collimated light beam emanates. The position of this terminal optical surface relative to the position of the baffles within the light scatter shield is critical to the performance of the present invention for the reasons discussed more fully hereinbelow. The construction of suitable collimators is well described in the scientific and patent literature.

The collimated light beam emanating from the terminal optical surface of the collimator will consist primarily of parallel light rays which are coaligned with the desired path. Even with a laser light source, however, a certain amount of off-axis illumination will occur as a result of optical imperfections in the system, such as scratches, pits, bubbles, and contamination on the optical elements, particularly the terminal optical surface. It is this off-axis illumination which the scatter shield of the present invention is intended to attenuate.

Referring now to FIG. 1, a scatter shield 10 constructed in accordance with the principles of the present invention is mounted on an enclosure 12 having a light beam source 14 mounted therein. A terminal optical element 16 is mounted in one wall of the enclosure 12 and receives light beam 18 (illustrated in broken line) which emanates from the light beam source 14. As illustrated, the light source 14 is not collimated and the terminal optical surface 16 is a collimating lens. It will be appreciated that the light source 14 might alternatively be a collimated source (e.g., a laser or a source having internal collimating means), where the terminal surface might be a window or a mirror. It will be further appreciated that the light source 14 may be of a type suitable for a number of uses, including but not limited to firearm aiming devices, target designators, communication transmitters, and spot illuminators.

The scatter shield 10 is located to receive the light beam 18 after it has passed through the collimating lens 16 and to attenuate any off-axis illumination, as described in more detail hereinafter. Scatter shield 10 will usually be detachably mounted on the enclosure 12, but may also be integrally formed with the enclosure.

Referring now to FIGS. 1 and 2, the scatter shield 10 comprises an elongate housing 20 which is substantially hollow or empty within its interior. Conveniently, the housing 20 will have a cylindrical interior wall, but other geometries may also find use.

A first baffle plate 22 is located within the interior of housing 20 and includes an aperture 24 which is substantially aligned with the direction of light beam 18. Usually, the aperture 24 will have a peripheral geometry which corresponds to that of the light beam 18, more usually having a circular peripheral geometry with a diameter substantially equal to that of the light beam 18. In some cases, however, it may be desirable to provide an aperture 24 having a diameter slightly larger than the light beam 18.

A second baffle plate 26 is positioned distally relative to the collimating lens 16. The second baffle plate 26 also includes an aperture 28 and the dimensions of both of the baffle plate and the aperture are usually but not necessarily the same as those of the first baffle plate 22.

The present invention contemplates that additional baffle plates (not illustrated) may be provided within the housing, particularly when the light may be scattered from the terminal optical surfaces at diameters larger than that of the laser beam. The use of three or more baffle plates, however, will not generally be required as it has been found that the use of two baffle plates provides very efficient attenuation of off-axis illumination.

By appropriately choosing the dimensions, materials and finishes of the scatter shield 20, the degree of beam scatter and the attenuation level of off-axis illumination can be controlled. The degree of acceptable beam scatter (designated $\theta$ in FIG. 1) is determined by the diameter a of aperture 28 (FIG. 2) and the distance d between aperture plate 26 and the terminal optical element 16. It will be appreciated that off-axis light rays may emanate from terminal optical element 16 in virtually any direction by scatter from its surfaces. In most directions, however, the off-axis light rays will strike an interior surface of the scatter shield 10 and be reflected and attenuated, as discussed in greater detail hereinafter. A certain scatter angle of the light beam 18, however, will be allowed as illustrated in FIG. 1. There, a scattered ray 30 which emanates from the lowermost region of terminal optical element 16 passes through aperture 28 at its upper end. This results in a maximum angle of scatter $\theta$ as illustrated in FIG. 1. The size of angle $\theta$ can be decreased by extending the distance d which baffle plate 26 is located from lens 16, by decreasing the diameter a of aperture 28, or be decreasing the diameter of terminal optical element 16. Other design criteria, however, should also be met in order to assure that the reflected off-axis illumination is sufficiently attenuated.

In the preferred embodiment, the dimensions of the scatter shield 22 will be selected to assure that any off-axis light rays which diverge from light beam 18 by an angle greater than $\theta$ will be internally reflected within the scatter shield at least three times. By providing internal surfaces which have low reflectivity, such multiple reflections will assure a high degree of attenuation. For example, a reflectivity of 2% at each surface results in maximum transmission along an escaping ray path of $8 \times 10^{-6}$ (equivalent to a minimum attenuation by a factor of 125,000).

To assure that all off-axis light rays diverging by an angle greater than $\theta$ undergo at least three internal reflections (for the preferred embodiment where the terminal optical surface 16 and apertures 24 and 28 have equal diameters), the dimensions of the light scatter shield 10 should satisfy the following relationships.

$$\frac{c}{d} \geq \frac{a}{b} \tag{1}$$

-continued $$\frac{c}{d} \le \frac{b}{(a+b)} \quad (2)$$

Satisfaction of equation (1) assures that no off-axis light ray can pass the first baffle plate at an angle which allows it to reflect through the outer aperture with a single reflection. Satisfaction of equation (2) assures that the first baffle plate is not too distant from the terminal optical surface of the collimator (i.e., lens 16) so that light rays can reflect from the interior surface of housing 20 and pass through both aperture plates without striking another interior surface. With both these conditions satisfied, no off-axis light rays which diverge by an angle greater than $\theta$ can escape from the scatter shield 10 without at least three internal reflections. When the diameters of terminal optical element 16 and apertures 24 and 28 are not equal, analogous equations can easily be derived.

Exemplary dimensions for the scatter shield 22 are as follows:

| Dimension | Broad Range | Narrow Range |
| --- | --- | --- |
| a | 0.5 mm to 15 cm | 1 mm to 5 cm |
| b | 1 mm to 30 cm | 1.5 mm to 10 cm |
| c | 4 mm to 1.5 m | 0.8 cm to 40 cm |
| d | 5 mm to 2 m | 1 cm to 50 cm |

The scatter shield 10 of the present invention will perform best when all internal surfaces are substantially specular, i.e., provide an angle of reflection which is numerically equal to the angle of incidence. Most previous light scatter shields employ non-specular internal surfaces in order to diffuse any stray light passing therethrough. By employing such diffusive scatter shields, a significant portion of the off-axis illumination may pass from the shield with fewer than three reflections from an internal shield surface. By employing specular reflection, the present invention is able to assure that substantially no off-axis illumination is able to escape without three reflections, resulting in highly efficient attenuation of the escaping light intensity. In certain cases, diffusive and partially-diffusive interior surfaces may also find use.

Figure 4:
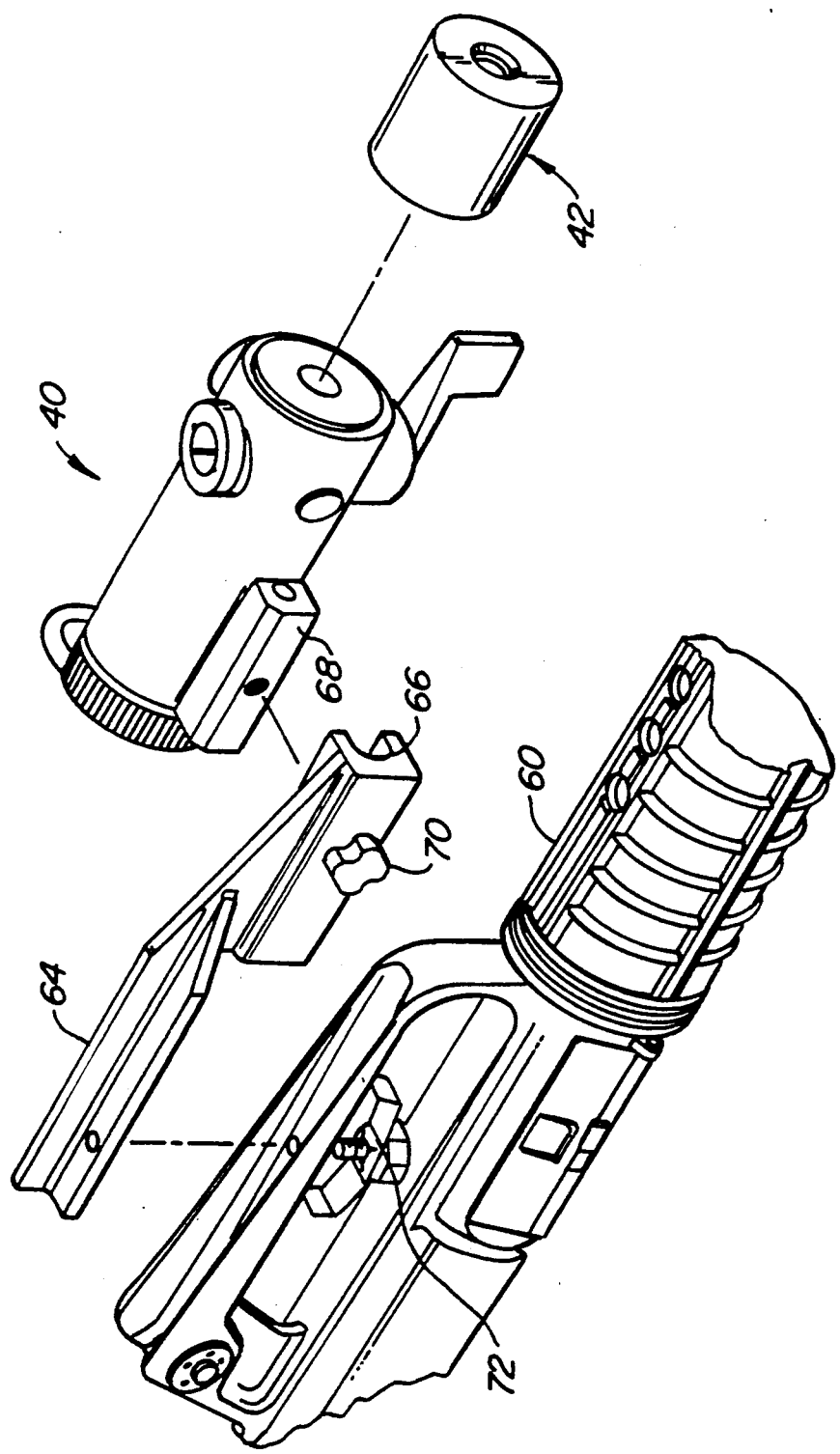
FIG. 4 is an exploded view illustrating the mounting of the laser transmitter of FIG. 3 on a firearm.

Referring now to FIGS. 3 and 4, a particular design for a laser transmitter 40 having a light scatter shield 42 mounted thereon will be described. It will be understood that this design is merely exemplary of the present invention and is in no way intended to limit the scope of the invention in any way. In FIG. 4, the transmitter is shown mounted on a firearm for use as an aiming device. The laser target designator 40 is conventional and may be of the type generally described in U.S. Pat. Nos. 3,787,693; 3,867,764; 4,152,754; 4,026,054; and U.S. Pat. No. 4,738,044, the disclosures of which are incorporated herein by reference. The transmitter 40 includes a laser light source 44 mounted therein, as well as means for powering the laser's light source (not illustrated). A laser light beam can emanate from a terminal optical surface (window) 46 through a central axial path in the scatter shield 42.

The scatter shield 42 includes an outer protective sheath 50 as well as an internal cylindrical wall 52 and internal baffles 54 and 56. The protective sheath 50 will generally be metal, while the liner 52 and baffles 54 and 56 will be composed of an optically opaque material. The surfaces of the liner 52 and baffle 54 are polished to provide for highly specular reflection, but are optically absorptive in order to provide for a low degree of reflectivity, typically being below about 2%, preferably being below about 1%. The aperture diameters in plates 54 and 56 will generally be in the range from about 0.5 mm to 1 cm, usually being about 1 mm to 0.5 cm, while the window 46 will usually have the same diameter, although it may be larger. The distance between the terminal optical surface (window) 46 and the first baffle plate 54 will be in the range from about 1 cm to 5 cm, while the distance from surface 46 to the second baffle plate 56 will be in the range from about 2 cm to 10 cm. The scatter shield 42 will operate as described above in connection with FIGS. 1 and 2.

The laser transmitter 40 may be mounted on a firearm 60 for use as an aiming device using a bracket 62 as illustrated in FIG. 4. The bracket 62 includes a channel member 66 which is secured to a mounting stud 68 on the target designator 40 by a thumbscrew 70. The other end of bracket 64, in turn, is secured to the firearm 60 by a second thumbscrew 72. In this way, the aiming device 40 can be detachably secured to the firearm 60.

Although the foregoing invention has been described in detail for purposes of clarity of understanding, it will be obvious that certain modifications may be practiced within the scope of the appended claims.

What is claimed is:

1. In combination with a light beam projector having a terminal optical surface from which a substantially collimated beam emanates, a scatter shield comprising:
   an elongate housing having a preselected length and internal width;
   means for securing the housing to the light beam projector;
   a first baffle plate extending transversely across the entire interior cross section of the housing and having a single aperture to allow passage of the collimated beam; and
   a second baffle plate extending transversely across the entire interior cross section of the housing and having a single aperture to allow passage of the collimated beam, wherein the first baffle aperture and second baffle aperture are coaxially-aligned to pass the collimated beam and the spacings between the terminal optical surface and the first baffle and between the terminal optical surface and the second baffle are selected to attenuate scattered light.

2. In combination with a light beam projector having a terminal optical surface from which a substantially collimated beam emanates, a scatter shield comprising:
   an elongate cylindrical housing having a preselected length and internal width;
   means for securing the housing to the light beam projector;
   a first baffle plate extending transversely across the interior of the housing and having a single circular aperture to allow passage of the collimated beam; and
   a second baffle plate extending transversely across the interior of the housing and having a single aperture to allow passage of the collimated beam, wherein the first baffle aperture and second baffle aperture are coaxially-aligned to pass the collimated beam and the spacings between the terminal optical surface and the first baffle and between the terminal optical surface and the second baffle are selected to attenuate scattered light.

3. A scatter shield as in claim 2, wherein the aperture in the first plate and aperture in the second plate have substantially the same diameter.

4. A scatter shield as in claim 3, wherein the collimated beam has a circular cross-section having a diameter substantially equal to the aperture diameter.

5. A scatter shield as in claim 3, wherein the aperture diameter and distance from the terminal optical surface to the second baffle plate are selected to provide an angle of beam divergence no greater than 10°.

6. A scatter shield as in claim 3, having dimensions which satisfy the equation:

$$\frac{c}{d} \geq \frac{a}{b},$$

wherein:
c is the distance between the terminal optical surface and the first baffle;
d is the distance between the terminal optical surface and the second baffle;
a is the aperture diameter; and
b is the internal housing diameter;
whereby light which does not pass directly through the ports must reflect from at least three surfaces prior to leaving the housing.

7. A scatter shield as in claim 6, having dimensions which satisfy the equation:

$$\frac{c}{d} \leq \frac{b}{(a + b)},$$

wherein:
c is the distance between the terminal optical surface and the first baffle;
d is the distance between the terminal optical surface and the second baffle;
a is the aperture diameter; and
b is the internal housing diameter;
whereby the first baffle is sufficiently close to the terminal optical surface to prevent light reflected from the interior housing surface from passing directly through the aligned apertures.

8. A scatter shield as in claim 2, wherein the interior of the housing and the baffles have surfaces which absorb light at the wavelength(s) of the collimated beam.

9. A scatter shield as in claim 8, wherein the interior of the housing and the baffles have substantially specular surfaces.

10. A scatter shield as in claim 8, wherein the reflectivity of the surfaces is no greater than about 2%.

11. A laser transmitter comprising:
surface, said light source being capable of projecting a beam from said surface along a desired path;
a cylindrical housing disposed axially along said path, said housing having an interior diameter b;
a first baffle plate within the housing having a circular aperture with a diameter a aligned on said path, said first baffle plate being spaced from the terminal optical surface by a distance c; and
a second baffle plate within the housing having a circular aperture with a diameter a aligned on said path, said second baffle plate being spaced from the terminal optical surface by a distance d;
wherein $$\frac{c}{d} \geq \frac{a}{b};$$

and $$\frac{c}{d} \leq \frac{b}{(a + b)}.$$

12. A laser transmitter as in claim 11, wherein the cylindrical housing is detachably mounted on an enclosure which includes the laser light source.

13. A laser transmitter as in claim 11, wherein the cylindrical housing is formed integrally with the enclosure.

14. A laser transmitter as in claim 11, wherein the diameter of the light beam is substantially equal to that of the apertures in the baffle plates.

15. A laser transmitter as in claim 11, wherein aperture diameter a and the distance d between the collimating plate are selected to provide an angle of maximum beam scatter no greater than 10°.

16. A laser transmitter as in claim 11, wherein the interior of the housing and the baffle plates have surfaces which absorb light at the wavelength of the light beam.

17. A laser light transmitter as in claim 16, wherein the interior of the housing and the baffles have substantially specular surfaces.

18. A laser transmitter as in claim 16, wherein the reflectivity of the surface is no greater than about 2%.

19. A laser transmitter as in claim 11, further comprising means on the enclosure for detachably securing the designator to a firearm.

20. A laser light transmitter as in claim 11, wherein the terminal optical surface is a lens, window, prism, or mirror.

21. In combination with a light beam projector having a terminal optical surface from which a substantially collimated beam emanates, a scatter shield comprising:
an elongate housing having a preselected length and internal width;
means for securing the housing to the light beam projector;
a first baffle plate which substantially blocks a planar cross section of the interior of the housing and includes a single aperture to allow passage of the collimated beam; and
a second baffle plate which substantially blocks a planar cross section of the interior of the housing and includes a single aperture to allow passage of the collimated beam, wherein the first baffle aperture and second baffle aperture are coaxially-aligned to pass the collimated beam and the spacings between the terminal optical surface and the first baffle and between the terminal optical surface and the second baffle are selected to attenuate scattered light.

* * * * *